United States Patent [19]

Head

[11] 4,334,232

[45] Jun. 8, 1982

[54] LAMINATED CHARGE PLATE FOR AN INK JET PRINTING DEVICE AND METHOD OF MANUFACTURING SAME

[75] Inventor: Donald L. Head, Kettering, Ohio

[73] Assignee: The Mead Corporation, Dayton, Ohio

[21] Appl. No.: 168,472

[22] Filed: Jul. 14, 1980

Related U.S. Application Data

[63] Continuation of Ser. No. 1,710, Jan. 8, 1979, abandoned.

[51] Int. Cl.[3] .......... G01D 15/18

[52] U.S. Cl. .......... 346/75

[58] Field of Search .......... 346/75, 140

[56] References Cited

U.S. PATENT DOCUMENTS

| | | | |
|---|---|---|---|
| 3,586,907 | 6/1971 | Beam | 346/75 X |
| 3,701,476 | 10/1972 | Houser | 346/75 |
| 3,786,517 | 1/1974 | Krause | 346/75 |
| 3,975,741 | 8/1976 | Solyst | 346/75 |
| 4,122,458 | 10/1978 | Paranjpe | 346/75 |
| 4,138,688 | 2/1979 | Heard | 346/75 |
| 4,194,211 | 3/1980 | Hoffman | 346/75 |

OTHER PUBLICATIONS

Nickols et al., Ink Jet Charge Plate Fabrication, IBM TDB, vol. 20, No. 5, Oct. 1977, p. 1939.

*Primary Examiner*—Joseph W. Hartary

*Attorney, Agent, or Firm*—Biebel, French & Nauman

[57] ABSTRACT

A charge plate is provided having a plurality of alternately sandwiched conductive and nonconductive elements with an end portion of each conductive element forming a charge surface which is positioned to correspond to an orifice position in an ink jet printing head with adjacent conductive elements being separated by the nonconductive elements. In one embodiment the nonconductive elements extend beyond the end portions of the conductive elements between positions of adjacent orifices and can be provided with additional spacer members opposite the charging surface on the opposite side of each orifice to form a series of tunnels associated with the orifices. A preferred form of fabrication includes photo-fabricating a series of members of nonconductive elements with thin lead-like conductive portions which extend from the charge surface to a remote terminus area where they are connected to a control device for providing an electrical charge individually to the charging surfaces. The conductive portions can be positioned asymetrically with regard to a central, longitudinal axis through each element extending perpendicular to the charging surfaces and are so formed that adjacent elements can be positioned with the thin lead-like portions on opposite sides of the centerlines of the elongated elements in order to reduce inter element capacitance which could result from high frequency switching during printing operations.

11 Claims, 9 Drawing Figures

LAMINATED CHARGE PLATE FOR AN INK JET PRINTING DEVICE AND METHOD OF MANUFACTURING SAME

This is a continuation, of application Ser. No. 1,710, filed Jan. 8, 1979 now abandoned.

BACKGROUND OF THE INVENTION

1. Field of the Invention

The present invention relates to ink jet printing devices of the type disclosed for example, in Sweet et al. U.S. Pat. Nos. 3,373,437 and Taylor et al. RE. 28,219, and more particularly to a charging plate and method of fabrication thereof for use in an ink jet printing head as disclosed, for example, in Beam et al. U.S. Pat. Nos. 3,586,907 and Houser 3,701,476.

2. Prior Art

One of the most common methods presently used for fabricating charge plates is by drilling or otherwise forming holes in a plate made of dielectric material, in properly spaced relation so that the holes will be in alignment with corresponding orifices formed in the orifice plate of an ink jet printing device. A series of discrete lines of electrically conductive coating material are formed on the plate and around each hole. Such a charge plate is disclosed for example in U.S. Pat. No. 3,586,907. These charge plates can easily be fabricated by conventional printed circuit techniques, however, the precision required in spacing and aligning of the holes as well as properly positioning the discrete conductive lead lines extending around and from each hole, is somewhat difficult to achieve especially in a repeatable manner as is required for high volume production.

In still further attempts to produce charge plates with evenly spaced charging faces or electrodes, a variety of methods of configuring a solid, single piece of substrata to provide a series of U-shaped channels along the edge portion thereof have also been devised. These charge plates are generally provided with charging surfaces in at least the base portion as well as along the sides of the U-shaped channels by using photo-fabrication or similar technique to plate a conductive material along the surface of the solid substrata. This technique, however, still requires extremely accurate machining techniques in order to form the channels at evenly spaced intervals along the edge of the substrata. The precision required results in this type of method being fairly expensive as well as difficult and time consuming to produce.

A still further attempt to produce uniformly spaced charging surfaces in a solid substrata involves the use of crystaline material such as silicone which has specific crystal orientation and can thus be etched to produce uniformly spaced channels along the surface or edge of a single piece which can then be secured by adhesive or otherwise to a larger support plate. This method does produce a series of uniformly spaced surfaces which can then be plated with a conductive material to provide uniformly spaced charging surfaces associated with orifice positions.

However, because of the fixed nature of the crystaline structure in such materials the positioning between adjacent orifices must be maintained in accordance with the required spacing for the etching of the material as is established by the crystaline structure thereof. Therefore, this produces a limitation upon the density of orifice spacing and/or requires the spacing to be established on the basis of the spacing of the charging surfaces which will result from the specific crystaline structure of the charge plate so fabricated. Thus, a loss in flexibility of density of orifice spacing occurs due to the limitations of the substrata material.

SUMMARY OF THE INVENTION

The present invention overcomes the above described difficulties and disadvantages associated with the prior art devices by providing a laminated charge plate formed of a plurality of alternating conductive and nonconductive elements secured together to form an elongated charge plate of generally rectangular cross section. The conductive elements are separated by nonconductive elements a sufficient distance that the conductive elements will be in registry with each of the corresponding orifices in the orifice plate of an ink jet printing device. In a preferred form, the conductive and nonconductive elements are positioned relative to one another such that an edge portion of each of the conductive elements forms a charging surface parallel to and adjacent the flow of printing liquid from an orifice, with all of the charging surfaces being recessed between adjacent edge portions of the nonconductive elements.

In addition, a spacer element may be added outboard of the charging surfaces and disposed between adjacent outer edge portions of the nonconductive elements on the opposite side of an orifice from the charging surface so as to form a charge tunnel defined by the charging surface, adjacent side wall surfaces of the nonconductive elements and the rear surface of the spacer element. Further, the entire charge tunnel can be coated with a conductive material which engages the conductive surface so that the complete tunnel becomes a charging electrode through which the drops pass from the associated orifice. Alternatively, a conductive coating can be placed on both sides of each nonconductive element over their entire surface in order to simplify manufacturing. Thus, when the elements are laminated the side walls of the charge tunnels will be conductive.

In some configurations, particularly where the orifices are spaced relatively close together, there is the possibility of inter element capacitance developing due to high frequency switching which is normal in the printing operation. In such embodiments a further advantage can be provided by producing an alternating configuration of adjacent conductive elements. For example, extending longitudinally along the axis of symmetry of the nonconducting elements, away from the position of the charging surface and perpendicular thereto, two adjacent conductive elements may be positioned alternately above and below the axis of symmetry of the nonconductive elements in order to provide maximum spacing between adjacent conductive elements and thus reduce the possibility of inter element capacitance.

Thus it can be seen, that the present invention provides a substantial advantage over the prior art devices discussed above in that it eliminates the need for accurate machining to position the charging surfaces to correspond to the respective orifices and merely requires the control of the thickness of the conductive and nonconductive elements which can be easily accomplished with conventional, inexpensive techniques. In addition, it provides the further advantage of being able to reduce inter element capacitance by providing spatial separation of adjacent conductive elements not contemplated by the prior art.

DETAILED DESCRIPTION OF THE PREFERRED EMBODIMENTS

As was indicated previously, the present invention is designed for use in an ink jet printing device of the type disclosed generally in Taylor et al. U.S. Pat. No. RE. 28,219 and particularly for use in an ink jet printing head as disclosed for example in Houser U.S. Pat. No. 3,701,476, reference to which can be made for an indication of the context in which the embodiments of the present invention may be utilized.

Figure 1:
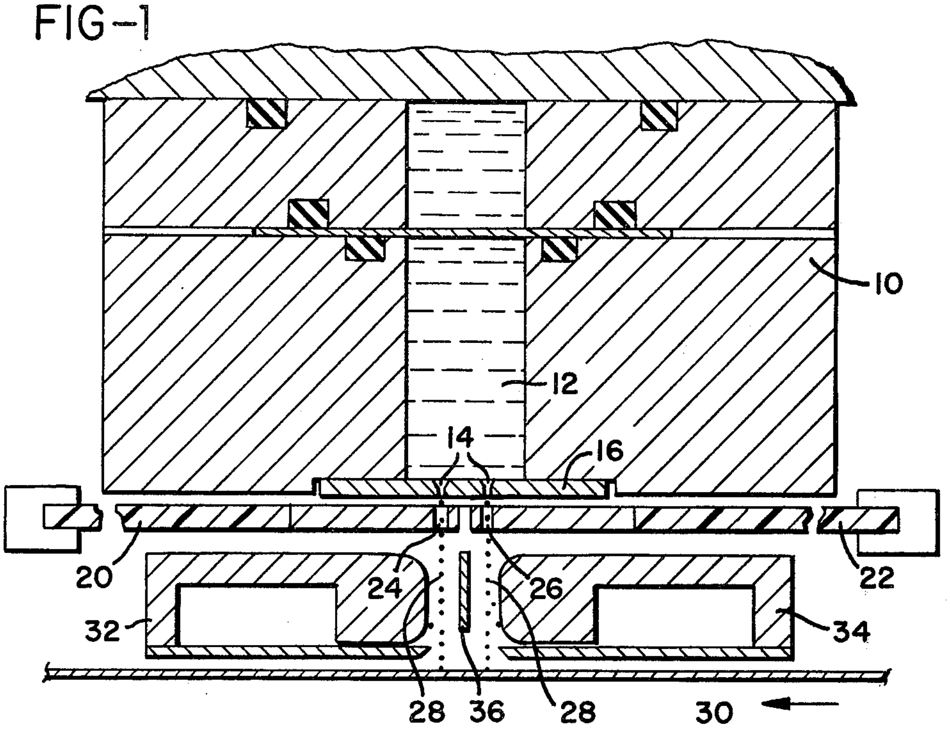
FIG. 1 is a cross sectional view through a conventional printing head illustrating the position of a pair of charge plates made in accordance with the present invention.

Such a printing head is shown schematically in cross section in FIG. 1 and is composed of a manifold 10 providing a central reservoir 12 in which the printing liquid is contained under pressure and which is ejected through a plurality of orifices 14 which extend in parallel rows in a plane perpendicular to the plane of the figure. The orifices are formed in an orifice plate 16 which is secured to the base of the manifold 10. Immediately beneath the orifice plate 16 are positioned a pair of charge plates 20 and 22 made in accordance with the present invention.

The openings or charge tunnels 24 and 26 formed therein correspond to the positions of the orifices 14 and a plurality of charge tunnels extend in registry with the plurality of orifices along the length of the orifice plate so that each orifice and the streams of droplets 28 which are expelled therefrom are all in registry. The droplets 28 will pass through the respective charge tunnels and either strike the recording medium 30, which can be, for example, a web of paper moving in the direction indicated by the arrow.

A pair of conventional catchers 32 and 34 are interposed between the charge plates 20 and 22 and the recording medium 30 adjacent the trajectories of the droplets. A deflection ribbon 36 is disposed between the parallel rows of droplets 28 coming from orifices 14 and, in a conventional manner, deflects selected ones of the droplets into the catchers so that they will not impact recording medium 30. The charge plates 20 and 22 are used to place the charge on the droplets coming from orifices 14 so that selected droplets upon which a charge is placed will be deflected by the deflection ribbon 36.

Figure 2:
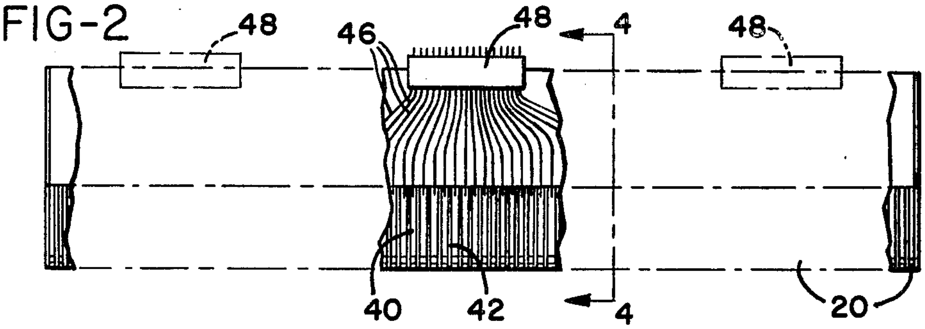
FIG. 2 is a plan view of a charge plate made in accordance with the present invention and secured to a base plate with a plurality of lead lines connected thereto for providing the charge to the individual conductive elements.
Figure 3:
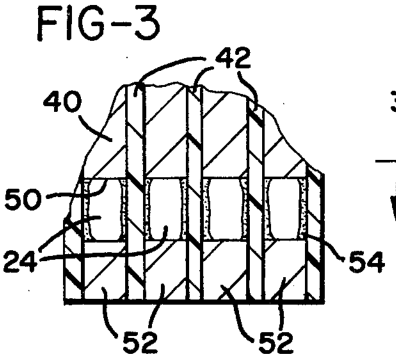
FIG. 3 is an expanded cross sectional view of a plurality of charge tunnels formed by the adjacent conductive and nonconductive elements laminated in accordance with the present invention.
Figure 4:
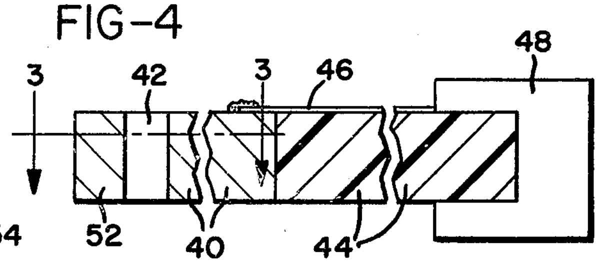
FIG. 4 is an enlarged cross sectional view along line 4—4 of FIG. 2.

Referring more specifically to the details of the construction of the preferred embodiments of charge plates of the present invention, one such contemplated construction is shown in FIGS. 2–4. In this construction the charge plate 20 (charge plate 22 is identical) is composed of a plurality of alternately positioned conductive elements 40 and nonconductive elements 42 sandwiched or laminated together to form an elongated charge plate of generally rectangular cross section as illustrated in FIG. 4. The conductive and nonconductive elements 40 and 42 can be secured together with an appropriate adhesive or by utilization of a frame structure (not shown) if desired.

As seen in FIG. 2, the plurality of conductive and nonconductive elements 40 and 42 after being laminated together are secured to a backing member 44 made of non-conductive material, to provide additional support for the laminated elements. In addition, backing member 44 provides a mounting surface for the plurality of lead wires 46 which extend from each of the conductive elements 40 to a junction block 48 which in turn is connected to the control mechanism, (not shown) for individually charging each of the conductive elements 40. A plurality of junction blocks 48 can be used for a single charge plate in order that all of the leads 46 do not have to terminate in a single junction block.

As illustrated in the embodiments of FIGS. 2–4, however, it is further contemplated that a spacer member 52 be positioned between the end portions of nonconductive elements 42 which extend outboard from the orifice position 14 in order to provide additional support for the nonconductive members and maintain proper spacing therebetween. These spacer elements 52 are of the same thickness as conductive elements 40 and thus maintain the parallel position of the adjacent nonconductive end portions of elements 42.

In addition, it is contemplated that in order to enhance the charging characteristics of each of the charge tunnels 24 a conductive coating 54 may be applied to the side walls of nonconductive elements 42 which form the charge tunnels 24. Also, the spacer element 52 can be formed of the same conductive material as element 40 thus resulting in the complete interior surfaces of each of the charge tunnels 24 being conductive to thus increase the uniformity of a charge placed on droplets passed through the charge tunnels 24. Obviously, if spacer member 52 is made of nonconductive material the inner surfaces should likewise be coated with a conductive coating such as 54 in order to place a conductive surface entirely around the inside of each of the charge tunnels 24. The use of conductive surfaces on the sidewalls of the charge tunnels has the further advantage of reducing "cross talk" between adjacent charging surfaces associated with adjacent orifices, so that droplets coming from adjacent orifices that are not supposed to be charged are not charged by the charge tunnel being actuated.

The lead wires 46 which extend from the junction blocks 48 are connected to their respective conductive members 40 such as by soldering or the like, in order to provide a conductive path from a lead wire to a conductive member. Lead wires 46 may be photo-fabricated on the base member 44 as is done with conventional charge plate fabrication.

Figure 5:
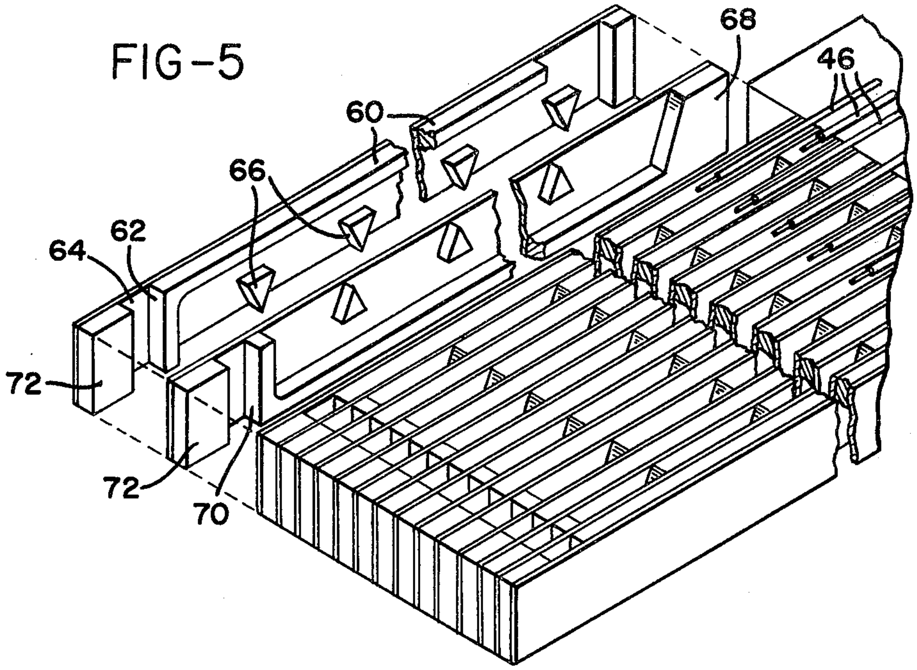
FIG. 5 is a pictorial view of an alternative preferred embodiment illustrating a configuration for the conductive and nonconductive elements to reduce inter element capacitance.
Figure 6:
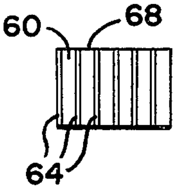
FIG. 6 is a view of a laminated charge plate as illustrated in FIG. 5, showing the overlapping regions of the support areas and the terminus connections associated with the charging elements.
Figure 7:
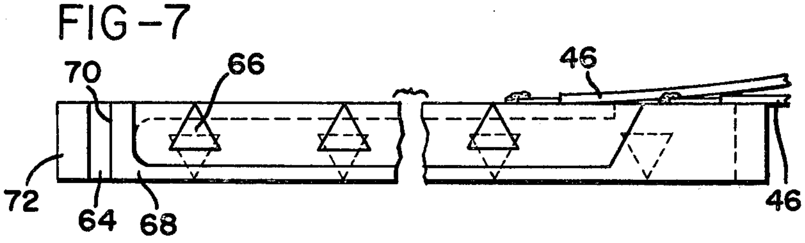
FIG. 7 is an end view outboard of the charge tunnels of the embodiment illustrated in FIG. 6.

Referring now to the embodiment illustrated in FIGS. 5–7, as mentioned above, when the spacing between adjacent orifices 14 is relatively close, the possibility of inter element capacitance being developed during the high frequency switching which occurs during the printing operation is enhanced due to the closeness of the positions of adjacent conductive elements. In order to reduce this possibility, it is contemplated that the conductive portions of adjacent conductive elements can be separated as illustrated.

Referring to FIG. 5 a first conductive element 60 may be configured as shown in order to place the conductive path along the upper region of the cross sectional envelope of the charge plate above the longitudinal axis of symmetry of an adjacent nonconductive element, and extending forward and then downward to present the charge surface 62. The nonconductive element 64 is of rectangular cross section and acts as a backing surface for the conductive element 60. Since, as can be seen from the illustration, the conductive element 60 is relatively thin and provides little supporting surface for the lamination between the nonconductive surfaces on each side thereof, a plurality of briding elements 66 are perferably provided. Bridging elements 66 can be either conductive or nonconductive elements since they do not contact the conductive elements 60. The purpose of these bridging elements is merely to provide support between adjacent nonconductive elements 64 since the ribbon like portion of conductive element 60 is insufficient for that purpose.

A second configuration of conductive element 68 is also illustrated which extends along the lower region of the rectangular cross sectioned envelope of the charge plate below the longitudinal axis of symmetry of this adjacent nonconductive element 64 and then upwards to present the charging face 70. As before, a plurality of bridging elements 66 are provided in order to increase the rigidity of the laminated assembly.

Thus, it can be seen that with these alternately laminated conductive elements 60 and 68 with the inner laminated nonconductive elements 64, the possibility of inter element capacitance is reduced since the conductive elements 60 and 68 are disposed respectively in upper and lower regions of the rectangular cross sectioned envelope of the charge plate so that the distance between the conductive elements is increased. The lead wires 46 are secured to each of the conductive elements 60 and 68 as with the previous embodiment although as can be seen from FIGS. 5 and 6, the positions of adjacent leads are staggered to the corresponding positions of the terminus areas of the conductive elements.

Again, although not illustrated in this embodiment, the charge tunnels formed in the laminated structure illustrated in FIGS. 5–7 may be coated around the entire inner surface thereof with a conductive material in order to provide a charging surface along the entire inner surface of each tunnel. Likewise, a plurality of spacer elements 72 are provided to separate the outer end portions of each of the nonconductive elements 64.

In the above described embodiments the conductive and nonconductive elements have been described as individual elements which are adhesively or otherwise secured together to form the charge plate. However, it is contemplated that a single combined element composed of a nonconductive portion with a conductive material deposited on the surface thereof or vice versa. The deposition of material can be accomplished for example, such as by photo-fabrication techniques. This combined element can be used in place of a nonconductive element and an adjacent conductive element of the types described above. These combined elements are then laminated together as in the above described embodiments to form a charge plate.

Figure 8:
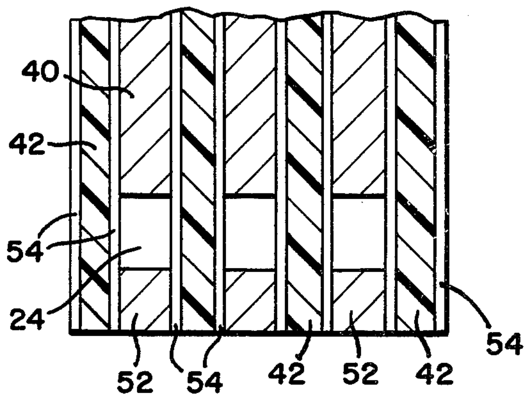
FIG. 8 is a cross sectional view similar to FIG. 3, of an alternative embodiment having a conductive coating applied to the nonconductive elements.

Alternatively, as a means of simplifying fabrication, rather than placing a conductive coating on the side walls of a charge tunnel 24 after fabrication as disclosed for example in the embodiment of FIG. 3, the conductive coating 54 can be applied to the entire surface area of both sides of each nonconductive element 42 as illustrated in the embodiment of FIG. 8. It is to be noted that if this fabrication technique is utilized it would not be necessary to make elements 40 conductive since connections could be made to the conductive coatings applied to nonconductive elements 42. In this case, in order to have all surfaces of the charge tunnels 24 conductive it would also be necessary to place a conductive coating on the end surfaces of elements 40 and 52.

Figure 9:
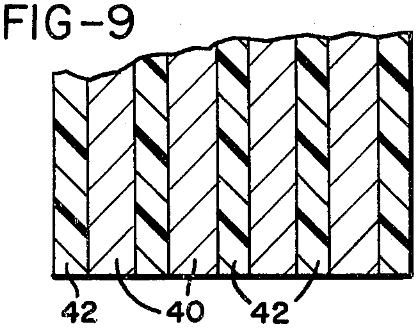
FIG. 9 is a cross sectional view similar to FIG. 8, of a further alternative embodiment without charge tunnels.

The present invention as illustrated in its simplest form in FIG. 9. In this embodiment the charge tunnels 24 have been eliminated so that the charge plate is merely formed of a plurality of laminated conductive and nonconductive elements 40 and 42, secured together by adhesive. This form of the invention is the easiest to manufacture, however, it does not possess some of the advantages discussed above for those embodiments having charge tunnels.

Although the foregoing illustrates the preferred embodiments and methods of construction of the present invention, other variations are possible. All such variations as would be obvious to one skilled in this art are intended to be included within the scope of the invention as defined by the following claims.

What is claimed is:

1. A charge plate for an ink jet printing device having a plurality of spaced orifices defined therein in a common plane for printing liquid discharge, comprising:

a plurality of conductive and nonconductive elements secured together in alternating sequence in a direction perpendicular to said common plane of the orifices to form an elongated charge plate of generally rectangular cross section with said conductive elements separated by said nonconductive elements a sufficient distance that said conductive elements will be in registry one each with a corresponding one of said orifices in said ink jet printing device, an edge portion of each said conductive element forming a charging surface parallel to and adjacent the flow of printing liquid from said orifices;

all of said charging surfaces being recessed between adjacent edge portions of said nonconductive elements and exposing side wall surfaces of said edge portions of said nonconductive elements; and a coating of conductive material on said side wall surfaces and engaging said charging surface.

2. A charge plate as defined in claim 1 including:

a spacer element secured between each said adjacent edge portion of said nonconductive elements outboard of said charging surfaces so as to form a plurality of charging tunnels each defined by said charging surface, adjacent side wall surfaces of said nonconductive elements and a rear surface of said spacer element.

3. A charge plate for an ink jet printing device having a plurality of spaced orifices defined therein in a common plane for printing liquid discharge, comprising:

a plurality of conductive and nonconductive elements secured together in alternating sequence in a direction perpendicular to said common plane of the orifices to form an elongated charge plate of generally rectangular cross section with said conductive elements separated by said nonconductive elements a sufficient distance that said conductive elements will be in registry one each with a corresponding one of said orifices in said ink jet printing device, an edge portion of each said conductive element forming a charging surface parallel to and adjacent the flow of printing liquid from said orifices all of said charging surfaces being recessed between adjacent edge portions of said nonconductive elements;

a spacer element secured between each said adjacent edge portion of said nonconductive elements outboard of said charging surfaces so as to form a plurality of charging tunnels each defined by said charging surface, adjacent side wall surfaces of said nonconductive elements and a rear surface of said spacer element; and means for securing said conductive and nonconductive elements together.

4. A charge plate as defined in claim 3 wherein said side wall surfaces of said nonconductive elements which form said charging tunnels are coated with a conductive material for improving charging efficiency and shielding liquid jet paths coming from each orifice from the charging fields of adjacent charge tunnels.

5. A charge plate as defined in claim 3 or 4 wherein each said conductive element is contoured so that a thin lead-like portion extends from said charging surface to a terminus area remote from said charging surface and is positioned asymmetrically with respect to the longitudinal centerline of said conductive element, adjacent said conductive elements being disposed with said lead-like portions on opposite sides of said centerlines to thereby reduce inner element capacitance.

6. A charge plate as defined in claim 5 including means secured to adjacent nonconductive elements for forming a bridging support therebetween in areas where said lead-like portions of said conductive elements do not extend.

7. A charge plate as defined in claim 6 wherein said securing means includes adhesive in bonding engagement with adjacent side wall surfaces of said conductive and nonconductive elements.

8. A method of fabricating a charge plate for use in an ink jet printing device having a plurality of ink discharge orifices defined wherein in a common plane, by securing together in alternating sequence a plurality of conductive and nonconductive elements to form a charge plate having a generally rectangular cross section both parallel and perpendicular to said common orifice plane and so that said conductive elements are separated by said nonconductive elements and an edge portion of each conductive element is disposed in a position corresponding to an ink jet orifice in a printing head of a ink jet printing device so as to form a charging surface, and portions of each nonconductive element are positioned to extend beyond said charging surfaces in the direction of said orifices; and each said conductive element being formed to have a thin lead-like portion extending from said charging surface to a terminus area remote from said charging surface and being asymmetrically disposed with respect to the longitudinal centerline of said conductive element; and placing adjacent conductive elements with said lead-like portions on opposite sides of said centerline so as to reduce interelement capacitance thereof.

9. A method of fabricating a charge plate for use in an ink jet printing device, comprising the steps of:

photo-fabricating a plurality of rectangular envelope elements having conductive and nonconductive portions, said conductive portions providing a conductive path along a major axis of each said element and forming a conductive surface along one edge portion of each said element perpendicular to said major axis to form a charging surface;

adhesively securing together in side-by-side relation a plurality of said elements so that said charging surfaces are aligned in corresponding positions to locations of ink jet orifices in said ink jet printing device for charging droplets expelled therefrom, and so that all conductive portions of adjacent elements are separated by nonconductive portions;

each said conductive portion being formed to have a thin lead-like portion extending from said charging surface and being asymmetrically disposed with respect to the longitudinal centerline of said element; and placing adjacent elements with said lead-like portions on opposite sides of said centerline so as to reduce interelement capacitance thereof.

10. A method of fabricating a charge plate for use in an ink jet printing device having a plurality of ink discharge orifices defined therein a common plane, wherein said method includes the steps of:

securing together in alternating sequence a plurality of conductive and nonconductive elements to form a charge plate having a generally rectangular cross section both parallel and perpendicular to said common orifice plane and so that said conductive elements are separated by said nonconductive elements and an edge portion of each conductive element is disposed in a position corresponding to an ink jet orifice in a printing head of an ink jet printing device so as to form a charging surface, edge portions of each nonconductive element are positioned to extend beyond said charging surfaces in the direction of said orifices to expose side wall surfaces of said nonconductive elements; and applying a conductive coating to said exposed side wall surface and engaging said charging surface.

11. A method as defined in claim 10, including the step of:

securing a spacer element between each said adjacent edge portion of said nonconductive elements outboard of said charging surfaces so as to form a plurality of charging tunnels each defined by said charging surface, adjacent side wall surfaces of said nonconductive elements and a rear surface of said spacer element.

* * * * *